No. 638,462.  
R. W. JEMISON.  
PERPETUAL RAILWAY TRAIN SCHEDULE AND TIME CARD.  
(Application filed Aug. 28, 1899.)  
Patented Dec. 5, 1899.

(No Model.)

Witnesses.  
Inventor.  
Robert W. Jemison.  
By James L. Norris,  
Atty.

THE NORRIS PETERS CO., PHOTO-LITHO., WASHINGTON, D. C.

UNITED STATES PATENT OFFICE.

ROBERT W. JEMISON, OF MACON, GEORGIA.

PERPETUAL RAILWAY-TRAIN SCHEDULE AND TIME-CARD.

SPECIFICATION forming part of Letters Patent No. 638,462, dated December 5, 1899.

Application filed August 28, 1899. Serial No. 728,732. (No model.)

*To all whom it may concern:*

Be it known that I, ROBERT W. JEMISON, a citizen of the United States, residing at Macon, in the county of Bibb and State of Georgia, have invented new and useful Improvements in Perpetual Railway-Train Schedules and Time-Cards, of which the following is a specification.

My invention relates to certain improvements in perpetual railway-train schedules and time-cards.

It is my object to provide a cheap and attractive article suitable for use in hotels and all public places by which the time of departure of trains from a central to all principal outlying points and the time of their arrival at such points can be distinctly shown and read at a glance, novel means being provided by which the changes in time of departure and time of arrival made by the railway officials either following the change in the seasons or for any other reason may readily be made upon the face of my time-card.

It is my purpose also to provide extremely simple means whereby all necessary information relating to railway communication at any given point and outlying points, as well as all intermediate places, can be plainly indicated and whereby all those changes in said indications necessary in order to secure correspondence with the official schedules may be made at each of the points shown on the time-card, thus making the latter capable of perpetual use.

I aim also to provide a device of the type mentioned capable of effective use as an adjunct of an advertising-card.

To enable others to understand and practice my said invention, I will now describe the same in detail, reference being had for this purpose to the accompanying drawings, in which—

Figure 1:
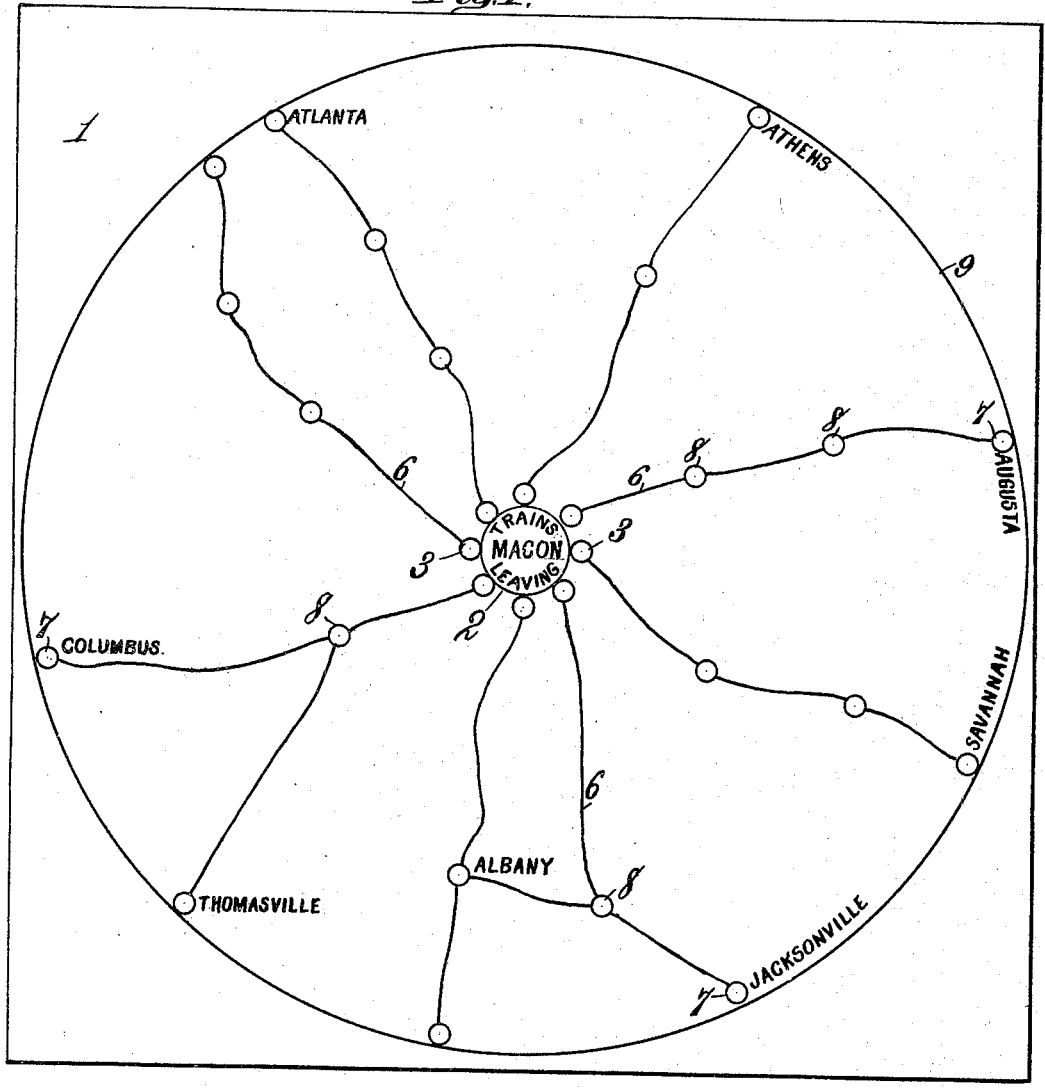
Figure 2:
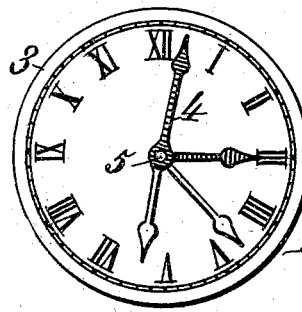

Figure 1 is a diagrammatic representation of the face of a perpetual railway-train schedule and time-card constructed in accordance with my invention. Fig. 2 is an enlarged view of one of the time-indicators.

The reference-numeral 1 in said drawings indicates a sheet of cardboard or other suitable material of such size as to include a proper representation of the relative locations of the several points. At or near the central point of the card a circle 2 or other suitable figure is placed to represent the town or city in which the card is to be used. At suitable points on this circle or other figure are represented dials 3, each of which is similar to the dial of an ordinary clock. Each dial is provided with one, two, or more pointers or index-fingers 4, capable of independent rotation around a central pivot 5. Those pointers which are to denote hours subsequent to twelve o'clock noon are differentiated from the others which denote the forenoon hours either by a difference in color or other suitable means. The several lines of railway leading out of the place indicated by the central circle or other figure are denoted by the lines 6, such as are commonly used in railway-maps, which are preferably caused to follow the direction and correspond geographically as far as possible with a true map. The outlying points 7 are each indicated by a dial the duplicate in construction of that already referred to, the only difference being that the dials 7 may have a less number of pointers than the dials 3. As each of the dials 3 is arranged at a point which may be regarded as central relatively to the terminal points denoted by the dials 7, the said dials 3 will indicate the time of departure of all trains, including local trains, which may run only to one or more intermediate points 8, and through trains, which run to the terminal points. As the dials 7 at the latter will only denote the times of arrival of the latter trains, it is evident that they will usually require a less number of hands or pointers than the dials 3. This is a matter, however, that will be controlled by circumstances, as there is no rule applicable thereto. The intermediate points 8 along each line are similarly provided, and all of said points are identified by having the names of the towns they represent placed by each. The names of the several lines of railway are also placed near said lines, and within the central circle or figure are the name of the town and the words "Trains leave."

The outlying points may conveniently be arranged, if desired, upon a large circle 9, and in the spaces at the angles of the card any suitable information can be printed, in conjunction with dials, showing arrival of trains from all important points by way of the several lines represented, foot-notes stating which trains carry local or through sleepers and chair-cars.

The advantages I claim are that the easy and inexpensive method of changing the card to correspond with changes in the railway-schedules renders it unnecessary to reprint any part, as any person can set the hands on the dials. The distinction between morning and afternoon trains has already been mentioned, and by means of a similar character distinctions can be made between through and way trains, &c.

My invention may also be used to show the time of arrival and departure of mails, as well as any regular periodical events, like church services, lodge-meetings, &c.

What I claim, and desire to secure by Letters Patent of the United States, is—

1. A perpetual train-schedule and time-card in which the outlying and intermediate places on one or more railway-lines are denoted by dials having pointers, each line having a similar dial at a central point, or place, the latter being set to show the time of departure, and the others the time of arrival of trains, on said lines, substantially as described.

2. A perpetual time-card having representations of lines of railway centering at a place where the card is used, a dial for each road at said point having a series of pointers distinguished one from another and capable of being set to show times of departure of the trains on that line and a similar dial at each outlying and intermediate point, having pointers capable of being set to show the time of arrival of said trains, substantially as described.

In testimony whereof I have hereunto set my hand in presence of two subscribing witnesses.

ROBERT W. JEMISON.

Witnesses:
WILLIAM D. ANDERSON,
W. R. WHITE.